United States Patent [19]

Kohn

[11] 3,755,149

[45] Aug. 28, 1973

[54] PROCESS FOR DESULFURIZING PETROLEUM RESIDS

[75] Inventor: Edward M. Kohn, Philadelphia, Pa.

[73] Assignee: Sun Oil Company of Pennsylvania, Philadelphia, Pa.

[22] Filed: June 9, 1971

[21] Appl. No.: 151,568

[52] U.S. Cl.................. 208/209, 208/208, 208/258, 208/294
[51] Int. Cl............................................ C10g 17/08
[58] Field of Search..................... 208/208, 294, 258, 208/209, 212

[56] References Cited
UNITED STATES PATENTS

| | | | |
|---|---|---|---|
| 1,952,616 | 3/1934 | Vose | 208/294 |
| 1,938,672 | 7/1929 | Ruthruff | 208/208 M |
| 1,801,412 | 4/1931 | Carlisle | 208/208 M |
| 2,772,211 | 11/1956 | Hawkes | 208/258 X |
| 1,807,924 | 6/1931 | Magill | 208/258 R |

FOREIGN PATENTS OR APPLICATIONS

| | | | |
|---|---|---|---|
| 392,142 | 12/1922 | Germany | 208/294 |

*Primary Examiner*—Delbert E. Gantz
*Assistant Examiner*—Juanita M. Nelson
*Attorney*—George L. Church, Donald R. Johnson, Wilmer E. McCorquodale and Paul Lipsitz

[57] ABSTRACT

A process for desulfurizing vacuum bottoms derived from a residual oil which comprises contacting said bottoms with metallic sodium in the presence of hydrogen, contacting the sludge-containing product thus produced with an aliphatic hydrocarbon, and separating the sulfur and sodium-containing sludge from the hydrocarbon solution of the desulfurized resid. Water washing the separated sludge removes sulfur and sodium, enabling the remaining hydrocarbon portion to be reclaimed.

4 Claims, No Drawings

PROCESS FOR DESULFURIZING PETROLEUM RESIDS

It is known in the art to desulfurize petroleum products with sodium. When such processes are carried out on petroleum residual oils, however, a sludge is formed which contains unreacted sodium and sodium-bound sulfur. This sludge must be separated from the desulfurized resid in order that the latter may be used as a low sulfur fuel oil. This sludge separation is particularly difficult when the residual oil treated with sodium is a vacuum tower bottom; i.e., the residue of a vacuum distilled crude or topped crude and also known as a short resid. This invention provides a means to readily separate the sludge formed in such a sodium treating process and also results in improved sulfur removal.

In accord with the invention, a vacuum tower bottoms resid is desulfurized by contacting said resid with sodium in the presence of hydrogen, contacting the sludge-containing product thus produced with an aliphatic hydrocarbon containing from about three to about eight carbon atoms, and separating the sludge from the solution of hydrocarbon containing the desulfurized resid. In a further embodiment of the invention, the separated sludge which is rich in hydrocarbon resid is washed with water to extract sodium and sulfides and the remaining hydrocarbon separated from the water wash and thus reclaimed fo further use.

The vacuum bottoms (i.e., the residue of crude distilled at about 1,050°F; a short resid) is readily contacted with sodium which may be done simply be adding solid pieces of sodium metal to hot resid and mixing thoroughly. As the sodium contacts the resid, which will be at a tempeature above the melting point of sodium, say at about 120°C., the sodium melts and thorough mixing effects its dispersion throughout the resid mass. The amount of sodium added will be at least about 1.5 times that theoretically required to form $Na_2S$. Thus for each gram of sulfur present in 100 grams of resid, at least about 2.16 grams of sodium will be added. After the sodium is dispersed in the resid the reactor is heated with stirring at a temperature of about 250° to about 400°C. and under hydrogen pressure of about 1 to about 100 atm., preferably less than about 1,000 p.s.i.g. The reaction mass is held under these conditions for about 1 to 3 hours to ensure complete reaction and then is cooled and a $C_3$ to $C_8$ aliphatic hydrocarbon added. The referred hydrocarbon for use in the system is pentane or hexane, but propane, butanes, heptanes, and octanes are also useful. It is of interest to note that aromatic hydrocarbons, e.g., benzene, are inoperable in the process. It is preferred to cool the reaction mass to a temperature below that of the hydrocarbon so that it may be added without loss by vaporization. The mixture of hydrocarbon and treated resid is heated under hydrocarbon reflux for a short time to ensure complete extraction of the hydrocarbon soluble material which is the desulfurized resid. This reflux usually requires about 0.5 to 2 hours. The cooled mass is subjected to a separation procedure to remove the sulfur-containing sludge from the hydrocarbon extract and this is readily accomplished, preferably by centrifugation, but other conventional separation techniques may be used. After separation of the sludge, the hydrocarbon is stripped from the resid by distillation and the desulfurized oil remaining is ready for immediate use as a low sulfur fuel.

As indicated above, the invention also contemplates water washing the separated sludge as a means to improve the amount of recovered low sulfur residual oil. The sludge which is separated after the light hydrocarbon treatment contains a significant amount of the residual oil. This sludge is freed of its sulfur and any sodium present by washing with hot water, usually at a temperature of from about 50°C. and higher. Such water wash should be done prior to coking the sludge as coking drastically reduces the effectiveness of the water wash. After washing the sludge it is allowed to separate into two layers and the petroleum layer simply separated off and either further processed separately or added back to the previously obtained desulfurized oil, thus significantly increasing the overall yield.

In order to further illustrate the invention the following examples are given:

EXAMPLES 1 TO 6

A vacuum resid from a Lagomedio crude containing about 3.4 percent sulfur is held at about 120°C. in a stirred, pressure reactor and an amount of solid sodium (pea size pieces) is added which corresponds to 3 moles of sodium per mole of sulfur in the crude. As the sodium is mixed in by stirring with a counter-rotating mixer it quickly melts and readily yields a complete dispersion where the average particle size of sodium is about 6 microns. The reactor is closed and heated to 350°C. and, where desired, pressured with hydrogen. After maintaining on temperature for 1 hour, the reactor is cooled to room temperature by quenching in cold water. It is opened and to the 75g. of product, 600 ml. of pentane is added and stirred in to disperse the sludge. The mass is refluxed for about 1 hour during which time the desulfurized product is dissolved away from the sludge. The mass is cooled and the sludge is separated by centrifugation and the sludge again extracted with fresh pentane. The combined pentane extracts are stripped of solvent and the desulfurized resid is weighed and analyzed. The following table indicates the results obtained on several runs made.

|  | Pressure of $H_2$ used during sodium treatment | Percent S in— | | Percent yield of pentane extracted resid | $H_2$ Consumption, s.c.f.b.[1] |
| --- | --- | --- | --- | --- | --- |
|  |  | Pentane extracted resid | Sludge |  |  |
| Example number: |  |  |  |  |  |
| 1 | 1 atm. $N_2$ | 0.24 | 6.67 | 54 | --- |
| 2 | 500 p.s.i.g. | 0.23 | 10.66 | 73 | 145 |
| 3 | 1 atm. $N_2$ | 0.33 | 6.81 | 50.7 | --- |
| 4 | 500 p.s.i.g. | 0.30 | 11.28 | 74.4 | 140 |
| 5 | 1,000 p.s.i.g. | 0.24 | 13.62 | 78 | 145 |
| 6 | 500 p.s.i.g. | 0.20 | 12.98 | 75.5 | 125 |

[1] Standard cubic feet per barrel of resid.

It is readily seen from the data above that the process of the invention where desulfurization is carried out with hydrogen present and followed by hydrocarbon extraction provides increased yields of product (compare Exs. 1 with 2, and 3 with 4, 5, and 6).

EXAMPLES 7 AND 8

The sludge obtained in Example 3 above is extracted with hot water to remove sulfur and any sodium present. The petroleum hydrocarbon separated from the water extract is added back to the pentane extract of Example 3 and in this way the total recovered low sulfur oil is increased by about 30 percent. The following table illustrates the effect of sulfur removal by the water extraction.

| Example No. | Type of Extraction | Percent Sulfur In Sludge | In Separated Oil |
|---|---|---|---|
| 7 | Vigorous agitation with water at 160°F. | 6.81 | 0.97 |
| 8 | Held under pressure at 600°F. for 1 hour | 6.81 | 0.17 |

It will be understood that numerous changes and variations may be made from the above description without departing from the spirit and scope of the invention.

The invention claimed is:

1. A process for desulfurizing vacuum bottoms of a short resid which consists of contacting said resid with metallic sodium at a temperature of from about 250° to about 400°C. and at a hydrogen pressure of from about 1 to about 100 atmospheres, extracting the sludge-containing product thus produced with an aliphatic hydrocarbon containing three to eight carbon atoms, separating the sludge from the hydrocarbon extract, and removing said hydrocarbon to yield a desulfurized resid.

2. A process as in claim 1 where the aliphatic hydrocarbon is pentane.

3. A process for desulfurizing vacuum bottoms of a short resid which consists of contacting said resid with metallic sodium at a temperature of from about 250° to about 400°C. and at a hydrogen pressure of from about 500 to about 1,000 p.s.i.g., extracting the sludge-containing product thus produced with an aliphatic hydrocarbon containing three to eight carbon atoms, separating the sludge from the hydrocarbon extract, extracting said separated sludge with hot water to obtain a low sulfur residual oil, and combining said residual oil with the aliphatic hydrocarbon-extracted desulfurized resid.

4. A process as in claim 3 where the aliphatic hydrocarbon is pentane.

* * * * *